(12) United States Patent
Frey et al.

(10) Patent No.: US 7,595,033 B2
(45) Date of Patent: Sep. 29, 2009

(54) REGENERATION OF NT-SCR CATALYSTS

(75) Inventors: Ruedi Frey, Effretikon (CH); Sandrine Person, Houilles (FR)

(73) Assignee: Von Roll Umwelttechnik AG (CH)

(*) Notice: Subject to any disclaimer, the term of this patent is extended or adjusted under 35 U.S.C. 154(b) by 170 days.

(21) Appl. No.: 11/812,768

(22) Filed: Jun. 21, 2007

(65) Prior Publication Data
US 2008/0089822 A1    Apr. 17, 2008

(30) Foreign Application Priority Data
Jun. 22, 2006   (EP)   ................. 06012824

(51) Int. Cl.
B01D 53/40   (2006.01)
B01D 53/56   (2006.01)
B01D 53/74   (2006.01)

(52) U.S. Cl. ............... 423/210; 423/240 R; 423/240 S; 423/242.1; 423/243.01; 423/244.01; 423/215.5; 423/245.1; 423/239.1; 423/DIG. 5; 423/DIG. 6; 422/105; 422/108; 422/110; 422/168; 422/169; 422/170; 422/171; 422/172; 422/177; 422/178; 502/20; 502/34; 502/54; 502/56

(58) Field of Classification Search ............... 502/20, 502/34, 54, 56; 423/210, 240 R, 240 S, 242.1, 423/243.01, 244.01, 215.5, 245.1, 239.1, 423/DIG. 5, DIG. 6; 422/105, 108, 110, 422/168, 169, 170, 171, 172, 177, 178
See application file for complete search history.

(56) References Cited
U.S. PATENT DOCUMENTS 4,070,305 A * 1/1978 Obayashi et al. ............ 502/54
4,141,959 A * 2/1979 Kato et al. ............... 423/239.1
4,142,989 A * 3/1979 Kohama et al. ............. 502/34
5,275,230 A   1/1994 Balling et al.
5,283,052 A   2/1994 Hums
2006/0153761 A1   7/2006 Bandl-Konrad et al.

(Continued)

FOREIGN PATENT DOCUMENTS
DE   36 34 360   3/1988

(Continued)

OTHER PUBLICATIONS
European Search Report for European Patent Application No. 06012824.6-1213, Dec. 12, 2006.

*Primary Examiner*—Timothy C Vanoy
(74) *Attorney, Agent, or Firm*—Hershkovitz & Associates, LLC; Abraham Hershkovitz

(57) ABSTRACT

A process and device for purifying flue gases in refuse incineration plants during regeneration of a catalyst which serves for reducing nitrogen oxides, by, in a first step, removing acidic pollutant gases from the flue gas in a wet or dry manner, in a second step adding ammonia for reducing nitrogen oxides to the flue gas purified in the first step, in a third step feeding the flue gas admixed with the ammonia to a catalyst, where the catalyst is heated at a controlled heat-up rate for regeneration, which leads to liberation of ammonia, where the amount of ammonia added in the second step and the heat-up rate in the third step are controlled by the amount of a pollutant gas selected from the group of ammonia, and which the purified flue gas contains.

12 Claims, 2 Drawing Sheets

U.S. PATENT DOCUMENTS

2007/0032373 A1* 2/2007 Matsumoto et al. ............ 502/20

FOREIGN PATENT DOCUMENTS

| | | |
|---|---|---|
| DE | 39 09 697 | 9/1990 |
| DE | 103 00 298 | 7/2004 |
| EP | 0 502 443 | 9/1992 |
| EP | 0 505 881 | 9/1992 |
| EP | 1 072 302 | 1/2001 |
| EP | 1 576 999 | 9/2005 |

* cited by examiner

REGENERATION OF NT-SCR CATALYSTS

CROSS-REFERENCE TO RELATED APPLICATIONS

This disclosure claims priority under 35 U.S.C. § 119 of European application No. 06 012 824.6, filed on Jun. 22, 2006, the disclosure of which is expressly incorporated by reference herein in its entirety.

BACKGROUND OF THE INVENTION

1. Field of the Invention

The present invention relates to a process for purifying flue gases in refuse incineration plants during regeneration of a catalyst which serves for reducing nitrogen oxides.

2. Discussion of Background Information

In various industrial branches, as, for instance in refuse incineration plants, hot flue gases are produced which contain solid and gaseous substances such as dust, flyash, heavy metals, dioxins, furans and also $SO_2$, $SO_3$, $NO_X$, CO and $CH_X$.

In the thermal treatment of waste, the flue gases, for recovery of the heat energy, are cooled in a steam kettle to a temperature of approximately 220° C.-240° C. Before exit into the environment, the flue gases must be freed from pollutants, taking into account legally established limiting values.

Historically, flue gases have been purified by, in a first step, carrying out dedusting by means of electrostatic precipitation or by cloth filters in the form of tubes or pockets. In a second step, the acidic pollutant gases were separated off by a wet or dry purification process. In a last step, denitrification took place. In order to be able to reduce the consumption of reducing agents, frequently catalysts were used (SCR, selective catalytic reduction, processes). The reaction takes place in these processes in the presence of a honeycomb or plate catalyst which is frequently connected within the exhaust gas purification of a refuse incineration plant as follows: a) by means of a high-temperature catalyst downstream of an exhaust gas scrubbing with heating; b) by means of a high-dust high-temperature catalyst downstream of the kettle or c) by means of a low-temperature catalyst as the last stage of exhaust gas purification.

Low-temperature catalysts which generally operate at a temperature range below approximately 220 to 230° C. have the advantage that heating the flue gas is customarily not needed. However, because they operate in the low-temperature range, they are very sensitive, compared with high-temperature catalysts, to salt-type compounds. Therefore, preceding dedusting takes place (low-dust connection) and also removal of acid pollutant gases, in order to prevent blocking and poisoning of active catalyst centers. Since this purification step is not completely successful, low-temperature catalysts must be regularly regenerated.

DE 36 34 360 describes catalyst filters. These were developed to combine four exhaust gas purification stages into one single step in which the catalytic filtration was extended, by addition of adsorbent, for dioxin reduction, and by addition of hydrated lime for dry sorption of acidic pollutant gases. In the filter medium, reactions can occur which are further accelerated by active zones in the filter material. They lead to condensation of ammonium salts, low-melting heavy metal salts and thereby to plugging of pores which can be accompanied by failure of filtration by increase in the pressure drop. EP 1 072 302 describes how such catalyst filters can be regenerated. In this process the catalyst filters are regenerated by simultaneous thermal and mechanical treatment. For this the temperature is elevated by means of a regeneration burner to above 280° C., preferably 320° C., and maintained for some hours. The injection of ammonia is stopped. Although these catalyst filters need not be dismantled for the regeneration process, during the regeneration time, however, refuse charging must be stopped and the combustion chamber must be kept hot using support burners. Customarily, an interruption of functions of approximately 3 to 8 hours must be expected until the regeneration process is complete.

EP 1 576 999 describes a process for purifying flue gases in which the flue gas is filtered, admixed with ammonia and subsequently brought into contact with a catalyst for denitrification. The catalyst is periodically regenerated at temperatures of 280 to 450° C., the catalyst unit to be regenerated being isolated. The purified exhaust gases are passed into the stack. As a result, pollutants released in a thermal regeneration can pass into the atmosphere.

SUMMARY OF THE INVENTION

It was an object of the present invention to provide a simple process and a device for purifying flue gases during the regeneration of catalysts, wherein the regeneration should take place during continuing refuse incineration.

The object is achieved by a process for purifying flue gases in refuse incineration plants during regeneration of a catalyst which serves for reducing nitrogen oxides, in which, in running refuse operation,
  a) acidic pollutant gases are removed from the flue gas in a wet, semi-dry or dry manner
  b) ammonia for reducing nitrogen oxides is added to the flue gas purified in step a),
  c) the flue gas from step b) which is admixed with ammonia is fed to a catalyst, with the catalyst being heated for the regeneration at a controlled heat-up rate, which leads to liberation of ammonia, with
    the amount of ammonia added in step b) and the heat-up rate in step c) being controlled by the concentration of a command variable selected from the group of ammonia and nitrogen oxide which the flue gas purified according to step c) contains.

Further preferred embodiments are subject matter of: The above process, in which the catalyst is heated to above 280° C., preferably to 300-350° C., and particularly preferably to 320° C.; One of the above processes, in which the catalyst is heated over a period of 3 to 8 hours, preferably 5 to 6 hours; One of the above processes, in which the catalyst is heated at 0.5 to 1° C. per minute; One of the above processes, in which the catalyst is heated by a heat radiator or a heating element heatable by steam or electric current directly or indirectly by hot carrier gas if appropriate consisting of steam or air; One of the above processes, wherein the carrier gas is formed by the air excess of a burner; One of the above processes, in which, under step a), the acidic pollutant gases are removed by addition of a dry additive selected from the group consisting of calcium hydroxide, alkali metal carbonate or alkaline earth metal carbonate and hydrogen carbonate, with subsequent filtration; One of the above processes, in which, under step a), the acidic pollutant gases are removed by wet scrubbing.

The object is also achieved by a device for carrying out a process as in one of the above processes, having an injection device for a dry additive (55), a filter (60), an injection device for a reducing agent (65) and a catalyst (70), which are arranged in a housing (50) into which flue gas can be fed via an inlet orifice (80), which flue gas, after contact with the catalyst, can be fed to a clean gas line (95), wherein the clean gas line (95) has a measuring device (100) for a command variable selected from the group of ammonia and nitrogen oxide.

It is possible by means of the process according to the invention to regenerate the catalyst in a simple and economic manner without needing to interrupt operations. The process of the invention described in detail hereinafter enables minimum emissions to be emitted, neither too much ammonia nor too much nitrogen oxide. In addition, it is simple to program and proceeds fully automatically as a result.

In the first purification stage, the acidic pollutant gases are separated off. This can proceed in a wet, semi-dry or dry manner. In the wet process the purification proceeds in two stages. First the flue gas stream passes through the acidic scrubber (pH<1) in which hydrogen chloride and hydrogen fluoride and also the volatile heavy metals are absorbed. In the subsequent alkaline scrubbing stage, the acidic pollutant gases such as $SO_2$ are bound in a wash solution which neutralizes, for example, by NaOH. Packed columns, Venturi scrubbers, radial stream scrubbers or tray columns are used.

Alternatively, the acidic pollutant gases can be separated off by a semi-dry process. In this process an aqueous solution or suspension of $Ca(OH)_2$ and $Ca(CO_3)_2$ is sprayed in the opposite direction to the flue gas which is at 200 to 400° C., wherein water completely evaporates and a solid heavy-metal-containing neutral salt mixture is formed. However, it would also be possible to spray $Ca(OH)_2$ which had been pressurized by water in the opposite direction to the hot flue gas at 200 to 400° C. (what is termed turbosorp process).

Alternatively, the acidic pollutant gases can be separated off by a dry process. In this process the flue gas is brought into contact with a dry additive selected from the group consisting of calcium hydroxide, activated carbon, alkali metal carbonate or alkaline earth metal carbonate and hydrogen carbonate, or mixtures thereof. Particularly preferably, the dry additive is sodium bicarbonate.

In the case of the semi-dry or dry process for removing the acidic pollutant gases, subsequently filtration is performed on cloth filters. After the wet process, no filtration is necessary, but is possible.

Subsequently, ammonia is fed to the flue gas which still contains small amounts of acidic pollutant gases. Using a low-temperature catalyst, the denitrification is carried out. The catalyst catalyzes the following reactions especially:

|  | I | $6\,NO + 4\,NH_3 \rightarrow 5\,N_2 + 6\,H_2O$ |
|---|---|---|
|  | II | $6\,NO_2 + 8\,NH_3 \rightarrow 7\,N_2 + 12\,H_2O$ |
| Side reaction | III | $SO_2 + 0.5\,O_2 \rightarrow SO_3$ |
| Secondary reaction | IV | $SO_3 + NH_3 + H_2O \rightarrow NH_4HSO_4$ |
| Secondary reaction | V | $SO_3 + 2NH_3 + H_2O \rightarrow (NH_4)_2SO_4$ |

As a result of the formation of the ammonia salts as a consequence of the side reaction and secondary reactions III and IV/V, that is to say by reaction of the acidic pollutant gases with ammonia, the activity of the catalyst decreases with time, which leads to the fact that it must be regenerated. For this, the catalyst is slowly heated in small stages, ammonia being liberated.

The heat-up rate is controlled in this case by the concentration of a command variable selected from the group of nitrogen oxides and ammonia which the purified flue gas (that is to say after removing the acidic pollutant gases and after denitrification) contains, nitrogen oxide being preferred as command variable.

As a result of the slow heating, the ammonia is liberated equally slowly and in smaller amounts than when rapid heating takes place. As a result, the ammonia can be used again for reduction of the nitrogen oxides. That is to say, in contrast to the conventional processes in which regeneration of the catalysts typically leads to high ammonia emissions, since as a result of the rapid heating, the liberated ammonia escapes in high concentration over a short period, as a result of the process of the invention, it can even be reused as reducing agent. This leads to the fact that during the regeneration of the catalyst, lower amounts of ammonia need to be added than during standard operations. However, in the standard case, an additional feed of ammonia always proceeds. If the amounts of ammonia which are formed in the regeneration of the catalyst are no longer sufficient, the nitrogen oxide concentration in the purified flue gas which is measured increases. If the concentration of this command variable increases above a defined value, this leads to the fact that ammonia can again be added to the as yet unpurified flue gas stream. This means that the concentration of this command variable in the purified flue gas controls, in addition to the heating rate, also the amount of added ammonia.

As a result of the decoupling of the steps of removing acidic pollutants and denitrification, fewer ammonium salts are formed which have an adverse effect on the catalyst activity. Since an economic process for regenerating the catalyst has been developed, it is also unnecessary, however, to ensure that no acidic pollutants come into contact with the ammonia. It is sufficient if a majority of the acidic pollutants are removed in the first process step.

As mentioned, the catalyst is regenerated over a relatively long time period, since the catalyst is heated up slowly. The catalyst is heated up slowly stepwise to above 280° C., preferably to 300 to 350° C., particularly preferably to 320° C. After this temperature is reached, the temperature is maintained. Typically, the catalyst is heated up over a period of 3 to 8 hours, preferably 5 to 6 hours. The catalyst in this case is preferably heated up at 0.5 to 1° C. per minute. As mentioned above, the optimum heat-up rate, however, is controlled by the concentration of a command variable such as nitrogen oxides or ammonia in the purified flue gas.

The catalyst can be heated up by a heat radiator or a heating element heatable by steam or electric current, directly or indirectly, by hot carrier gas consisting if appropriate of steam or air. Preferably, the carrier gas is formed by the air excess of a burner. Particularly preferably, the burner is operated directly in the flue gas stream.

The cycle time between two regeneration cycles is ideally adapted in such a manner that in addition to minimum emissions, minimum energy consumption also results. The cycle is selected in such a manner that even with the customary process-specific variations, no impairment of the catalyst activity takes place, that is to say the regeneration takes place as a preventive measure. Alternatively, the period can be adapted to the integral of the $SO_2$ emission in the purified flue gas, which corresponds to the degree of fouling, wherein also a safety margin (that is to say a shorter interval than is theoretically necessary) is selected. Even in the case of a relatively high use of the dry additive and separation to approximately 5 mg/m³N of $SO_2$ (N=0° C./1013 mbar), a loss of activity after 2000-3000 operating hours cannot be prevented, so that the regeneration is required at the latest after 2000 operating hours.

The process of the invention is preferably carried out in a device which is known to those skilled in the art. Such a device is described, for example, in EP 1 072 302. In contrast to the known devices, however, they are, however, equipped with a control system which determines the emission values of the purified flue gas, wherein these emission values control the heat-up rate of the catalyst and the amount of ammonia to be fed. In brief, the essential parts of the device are summarized hereinafter in FIG. 2.

DETAILED DESCRIPTION OF THE PRESENT INVENTION

Figure 1:
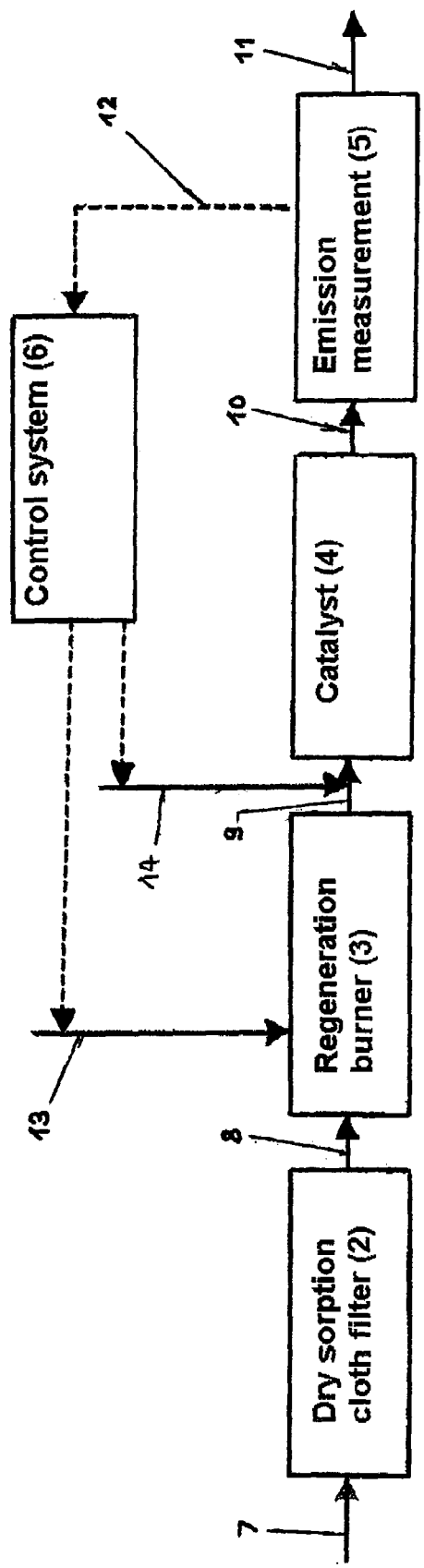
FIG. 1 shows diagrammatically the process according to the invention.

FIG. 1 shows diagrammatically the process according to the invention. The flue gases 7 from a combustion process, such as, for example, a refuse incineration process, are freed from acidic pollutant gases such as HCl, HF, $SO_2$ and also heavy metals, dusts and organic pollutants such as dioxins/furans by addition of dry additives such as, for example, sodium bicarbonate and activated carbon, the latter being used for removal of mercury and dioxin impurities, and subsequent filtration 2 on cloth filters.

Emission measurement 5 of HCl and $SO_2$ is used to control the metering of the dry additive for neutralization (for example sodium. bicarbonate) for the purpose of complying with the emission limiting value; the additive for adsorbing mercury and organic trace substances (for example activated carbon) is customarily metered in in proportion to the flue gas volumetric flow rate.

The ammonia 14 required for the catalytic denitrification reaction is injected into the flue gas channel upstream of the catalyst 4 as a function of the $NO_X$ emission value determined in the emission measurement 5.

In order to have an optimum temperature for the catalytic denitrification reaction, customarily at the inlet of the exhaust gas purification 7, a temperature of approximately 190° C. is selected. With the heat losses, such an operating temperature of the catalyst of approximately 180° C. can be ensured. This temperature is also suitable when dry sorption is carried out.

The ammonia injection 14 is controlled by the $NO_X$ pure gas value via a control system 6. The firing is usually continued with refuse, wherein, depending on design of the regeneration burner 3 and the fan, the load can be decreased. The temperature of the catalyst 4 is increased by starting the regeneration burner 3 and controlling the gas feed 14 in such a manner that the temperature at the outlet of the catalyst 10 increases at a base preset rate of 0.5° C./min.

As soon as, by emission measurement, a signal 12 is detected which exceeds the threshold value of the emissions of $NH_3$ and other pollutants, the heat-up rate is reduced:

| Emission value in mg/m³ of N or 11% $O_2$ in the dry gas | Heat-up rate (° C./min) |
| --- | --- |
| $NH_3 \geq 5$ | 0.25 |
| $NH_3 \geq 10$ | 0 |
| $SO_2 \geq 50$ | 0 |
| $HCl \geq 10$ | 0 |

As soon as the temperature rise is reduced or stopped, the decomposition of the salts is also retarded and the emissions fall as a result back below the threshold value. The heating can then be continued.

During the temperature rise in the catalyst, ammonium sulfate present decomposes into ammonia and sulfuric acid; the ammonia reacts with the $NO_X$ of the flue gases; as a result, the amount of freshly injected ammonia 14 is automatically controlled to be lower. When the regeneration process is terminated, the process again requires the same amount of ammonia as before the start of the regeneration. The endpoint is indicated by this means; for safety, heating is continued further for some time, for example 2 h.

Figure 2:
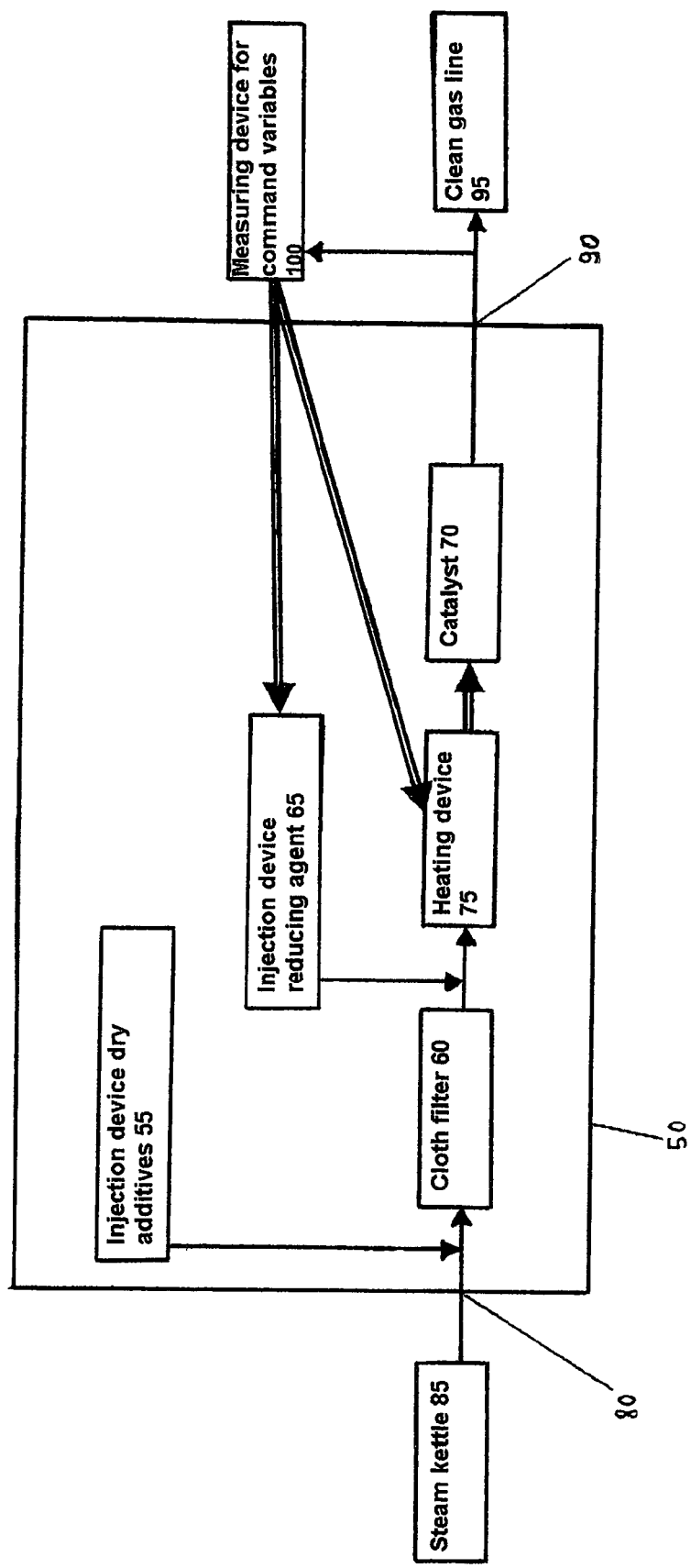
FIG. 2 shows diagrammatically the device according to the invention.

FIG. 2 shows a preferred embodiment of a device for the process according to the invention.

The process is preferably carried out in a housing 50 which has an injection device 55 for a dry additive, a filter 60 which is arranged downstream of the injection device 55 for the dry additive, an injection device 65 for a reducing agent, and a catalyst 70. The housing 50 can, in addition, contain a heating device 75 such as, for example, a burner, but it is also conceivable that the heating device is situated outside the housing. The flue gas is fed in this case to the housing 50 via an inlet orifice 80, with the flue gas being previously cooled in a cooling vessel 85. In the housing 50 it comes into contact with the dry additive and is subsequently purified from the acidic pollutant gases by the filter which is preferably a cloth filter. Subsequently the reducing agent is added by means of the injection device 65 for the reducing agent, which is preferably ammonia, to the flue gas which has been purified from the acidic pollutant gases and the flue gas comes into contact with the catalyst. The purified flue gas is subsequently passed into the clean gas line 95 via an outlet orifice 90, with it coming into contact with a measuring device 100, the measured emission values of which, in particular the nitrogen oxide and/or ammonia content, serve as command variables for the heat-up rate and for the amount of ammonia fed.

What is claimed is:

1. A process for purifying flue gases in refuse incineration plants during regeneration of a catalyst which serves for reducing nitrogen oxides, in which, in running refuse operation,
   a) acidic pollutant gases are removed from the flue gas in a wet, semi-dry or dry manner,
   b) ammonia for reducing nitrogen oxides is added to the flue gas purified in step a),
   c) the flue gas from step b) which is admixed with ammonia is fed to a catalyst, with the catalyst being heated for the regeneration at a controlled heat-up rate, which leads to liberation of ammonia, with the amount of ammonia added in step b) and the heat-up rate in step c) being controlled by the concentration of a command variable selected from the group of ammonia and nitrogen oxide which the flue gas purified according to step c) contains.

2. The process as claimed in claim 1, in which the catalyst is heated to above 280° C.

3. The process as claimed in claim 1, in which the catalyst is heated over a period of 3 to 8 hours.

4. The process as claimed in claim 1, in which the catalyst is heated at 0.5 to 1 ° C. per minute.

5. The process as claimed in claim 1, in which the catalyst is heated by a heat radiator or a heating element heatable by steam or electric current, directly or indirectly by hot carrier gas if appropriate consisting of steam or air.

6. The process as claimed in claim 5, wherein the carrier gas is formed by the air excess of a burner.

7. The process as claimed in claim 1, in which, under step a), the acidic pollutant gases are removed by addition of a dry additive selected from the group consisting of calcium hydroxide, alkali metal carbonate or alkaline earth metal carbonate and hydrogen carbonate, with subsequent filtration.

8. The process as claimed in claim 1, in which, under step a), the acidic pollutant gases are removed by wet scrubbing.

9. A device for carrying out a process as claimed in claim 1, having an injection device for a dry additive, a filter, an injection device for a reducing agent and a catalyst, which are arranged in a housing into which flue gas can be fed via an inlet orifice, which flue gas, after contact with the catalyst, can be fed to a clean gas line, wherein the clean gas line has a measuring device for a command variable selected from the group of ammonia and nitrogen oxide.

10. The process according to claim 2, wherein the catalyst is heated from 300 °C to 350° C.

11. The process according to claim 10, wherein the catalyst is heated to 320° C.

12. The process according to claim 3, wherein the catalyst is heated from 5 hours to 6 hours.

* * * * *